United States Patent Office 3,158,641
Patented Nov. 24, 1964

3,158,641
HYDROCARBONTHIOPHOSPHONOXY-HYDROXY-OXAHEXYL ALKENOATES
David D. Reed, Glenham, and James M. Petersen, Fishkill, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,653
6 Claims. (Cl. 260—461)

This invention relates to novel reaction products of hydroxyalkyl hydrocarbonthiophosponates and epoxyalkyl alkenoates. More particularly, it pertains to hydrocarbonthiophosphonoxyhydroxyoxahexyl alkenoates.

The hydrocarbonthiophosphonoxyhydroxyoxahexyl alkenoates of the invention are useful as a thermal stability agent in fuels such as jet fuel.

The hydrocarbonthiophosphonoxyhydroxyoxahexyl alkenoates are represented by the formula:

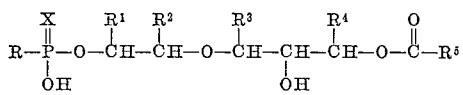

wherein R is a hydrocarbon derived monovalent radical (hydrocarbyl), $R^1$, $R^2$, $R^3$ and $R^4$ are radicals selected from the group consisting of hydrogen and alkyl of from 1 to 6 carbons, $R^5$ is an alkenyl radical of 2 to 20 carbons and X is a chalcogen selected from the group consisting of sulfur or a mixture of sulfur and oxygen.

Broadly, the hydroxyoxahexyl alkenoates are formed by reacting hydroxyalky hydrocarbonthiophosphonate with epoxyalkyl alkenoate at an elevated temperature, preferably in the presence of a catalyst.

PREPARATION OF THE THIOPHOSPHONATE REACTANT

The hydroxyalkyl hydrocarbonthiophosphonate reactant is of the formula:

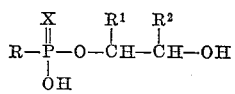

where R is a hydrocarbon derived monovalent radical (hydrocarbyl), $R^1$ and $R^2$ are hydrogen or an alkyl from 1 to 6 carbons and X is sulfur or a mixture of sulfur and oxygen. The thiophosphonate reactants contemplated herein are described in commonly-assigned, copending application Serial No. 59,505, now Patent No. 3,087,956 filed September 30, 1960. Further, the preparation of the hydroxyalkyl hydrocarbonthiophosphonates is described in commonly-assigned, copending application Serial No. 63,973, now Patent No. 3,123,630 filed October 21, 1960. As pointed out in these copending applications, R can be derived from an aromatic, cycloaliphatic and aliphatic hydrocarbons. R is generally derived from a polyolefin containing at least 12 carbon atoms although lower molecular weight olefins can be employed. Examples of the polyolefin materials from which R is derived are the monoolefin polymers such as polyisobutylene, polybutene, polypropylene and copolymers of monoolefins such as propylene-isobutylene copolymer. R groups having an average molecular weight between about 250 and 50,000, preferably between 600 and 5,000, are contemplated. A polybutene derived radical of an average molecular weight between 600 and 5,000 is an example of a preferred R group.

As further pointed out in co-assigned, copending applications Serial No. 59,505, now Patent No. 3,087,956 and 63,973, now Patent No. 3,123,630, the thiophosphonate reactant is prepared by reacting $P_2S_5$ with hydrocarbon, the $P_2S_5$ constituting 5 to 40% of the reaction mixture, at a temperature between about 100 and 320° C. in a non-oxidizing atmosphere, for example, under a blanket of nitrogen. The hydrocarbon-$P_2S_5$ recation product is contacted with steam at a temperature between 100 and 260° C. The steam treatment hydrolyzes the hydrocarbon-$P_2S_5$ product to a hydrocarbonthiophosphonic acid and inorganic acids. The hydrocarbonthiophosphonic acid has the general formula:

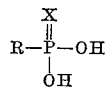

wherein R is derived from the original charged hydrocarbon and is usually a mono-olefinic, monovalent radical containing 20 to 200 carbon atoms and X is sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The inorganic phosphorus acids formed during hydrolysis of the hydrocarbon-$P_2S_5$ reaction product are removed prior to reaction of the thiophosphonic acid with alkylene oxide. A number of different procedures are available for removal of the inorganic phosphorus acids. U.S. Patent Nos. 2,951,835 and 2,987,514 disclose the removal of inorganic phosphorus acids by contact with synthetic hydrous alkaline earth metal silicates and synthetic hydrous alkali metal silicates, respectively. Commonly assigned, copending application, Serial No. 841,668, filed September 23, 1959, by H. D. Kluge and R. G. Lacoste describe a process wherein inorganic phosphorus acids are removed from the hydrolyzed product by extraction with anhydrous methanol.

The thus formed hydrocarbonthiophosphonic acid is reacted with an alkylene oxide of the formula:

wherein $R^1$ and $R^2$ are as heretofore defined, at a temperature between about 60 and 150° C. to form the hydroxyalkyl hydrocarbonthiophosphonate reactant. Specific examples of the hydroxyalkyl hydrocarbonthiophosphonate reactant contemplated herein are 2-hydroxyethyl polybutene(940 M.W.)thiophosphonate, 2-hydroxy-2-ethylethyl polybutene(1200 M.W.)thiophosphonate,1-methyl-2-hydroxyethyl polyisobutylene(2000 M.W.)thiophosphonate, and 2-hydroxyethyl polyisopropylene(2500 M.W.)thiophosphonate.

THE EPOXYALKYL ALKENOATE

The epoxyalkyl alkenoates which react with the hydroxyalkyl hydrocarbonthiophosphonates to form the hydroxyoxaalkyl alkenoates of the invention are represented by the general formula:

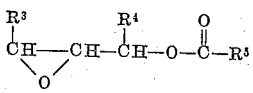

where $R^3$ and $R^4$ are radicals selected from the group consisting of hydrogen and alkyl from 1 to 6 carbons and $R^5$ is an alkenyl radical of from 2 to 20 carbons. Specific examples of the epoxyalkyl alkenoates contemplated herein are 2,3-epoxypropyl 2-propenoate; 2,3-epoxybutyl 3-butenoate; 1-methyl-2,3-epoxypropyl 4-hexenoate.

CATALYST

For the recation to proceed between the epoxyalkyl alkenoate and the hydroxyalkyl thiophosphonate catalyst need not be present. However, its presence to facilitate the reaction is desirable. Examples of the catalyst suitable herein are acid catalysts such as the Lewis acids, mineral acids and organic acids and base catalysts such as alkali metals and alkali metal alcoholates. Specific examples of the acid and base catalysts contemplated herein are $BF_3 \cdot C_2H_5OC_2H_5$, $BF_3$, $HF$, $AlCl_3$, $SnCl_4$, $TiCl_4$, $ZnCl_4$, $H_2SO_4$, $H_3PO_4$, $CCl_3CO_2H$, $CF_3CO_2H$, Na, K, and $CH_3ONa$.

PREPARATION OF THE HYDROCARBYLTHIOPHOSPHONOXY-HYDROXYOXAHEXYL ALKENOATES

The hydroxyoxahexyl alkenoates of the invention are prepared by contacting the hydroxyalkyl hydrocarbonthiophosphonates with epoxyalkyl alkenoate at a temperature between about 50 and 150° C., optionally, in the presence of catalyst in a mole ratio of epoxyalkyl alkenoate to thiophosphonate reactant to catalyst (if used) of between about 0.5:1:0.01 and 2:1:0.1. Although atmospheric pressure is normally employed, subatmospheric and superatmospheric pressure may be utilized.

The product of the reaction mixture may be purified by any standard means such as fractionation. One method of fractionation is removing the unreacted reactants by stripping with an inert gas, e.g., nitrogen at a reduced pressure, e.g., less than 30 mm. Hg and at a temperature between 50 and 150° C. For those impurities not removed by stripping, clay contacting, contacting with an ion exchange resin and other suitable purification procedures are employed.

Specific examples of the hydrocarbonthiophosphonoxy-hydroxyoxahexyl alkenoates contemplated herein are 6-polybutene-(940 M.W.)thiophosphonoxy - 2-hydroxy-4-oxahexyl 2-propenoate, 6-polyisopropylene(1500 M.W.)-5-methyl-2-hydroxy-4-oxahexyl-4-heptenoate, and 6-polypentene(2500 M.W.)thiophosphonoxy - 1,3,5,6-tetramethyl-2-hydroxy-4-oxahexyl oleate.

The following examples further illustrate the invention but are not to be taken as limitations thereof. Example I illustrates the preparation of the thiophosphonate reactant and Example II is directed to the preparation of the novel alkenoate products of the invention.

Example I

A polybutene-$P_2S_5$ reaction product was prepared by reacting polybutene of an average molecular weight of about 940 with $P_2S_5$ in a mole ratio of polybutene to $P_2S_5$ of 1.1:1 and in the presence of sulfur in an amount equal to 3 wt. percent of the polybutene. After continuous reaction at 232° C. until the reaction mixture is soluble in n-pentane, the reaction product was diluted with approximately 150 wt. percent of a naphthene base oil having an SUS viscosity of 100 at 100° F. The diluted product was steamed for 10 hours in a nitrogen atmosphere and then dried by the passage of nitrogen therethrough at 176° C. The steamed product was extracted with 50% aqueous methanol at 55° C. to give a methanol extract containing inorganic phosphorus acid and a lubricating oil raffinate containing polybutene(940 M.W.)thiophosphonic acid of the formula:

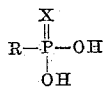

which after stripping the raffinate free of methanol had a Neut. No. of 21.0 and where R was a polybutene radical of an average molecular weight of 940. The theoretical sulfur content of the raffinate containing a thiophosphonic acid of the formula:

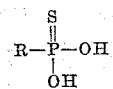

where R is as heretofore defined, is 1.19 wt. percent. The actual sulfur found in the thiophosphonic acid product was 0.51 wt. percent indicating that X in the thiophosphonic acid product is a mixture of sulfur and oxygen.

7000 grams of the oil solution, as prepared above, containing 2.61 moles of polybutene(940 M.W.)thiophosphonic acid were charged to a 12 liter, 3-neck flask equipped with a stirrer, a gas inlet tube extending below the surface of the acid reactant, a thermometer immersed in the acid and a reflux condenser cooled with a Dry Ice-acetone mixture. The thiophosphonic acid was heated to 121° C. over a 1 hour period with continuous stirring and nitrogen blowing at approximately 1 liter/minute. While the temperature in the flask was maintained at 121° C. and the nitrogen flow rate was reduced to 0.01 liter/minute, ethylene oxide was passed through a trap in which it was mixed with nitrogen and introduced into the reaction flask at a rate so as to maintain a gentle reflux. When ethylene oxide was no longer taken up as evidenced by an increase in the reflux, its addition was stopped and the excess ethylene oxide in the reaction mixture was allowed to reflux for 1 hour. At the end of this period the ethylene oxide remaining in the reaction flask was flushed therefrom by passage of nitrogen through the reaction for a 1½ hour period at 121° C. On cooling there was obtained an oil solution containing a reaction product which was shown by analysis to be 2-hydroxyethyl polybutenethiophosphonate of the formula:

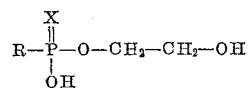

where R and X is as heretofore defined. The product in oil analyzed as follows:

| Description | Calculated | Found |
|---|---|---|
| Neut. No. | 0.00 | 2.80 |
| Hydroxyl No. | 21 | 30 |
| Phosphorus, wt. percent | 1.14 | 1.10 |
| Sulfur, wt. percent | 1.18 | 0.69 |

Example II 544 grams of the oil solution prepared as in Example I containing 0.2 mole of 2-hydroxyethyl polybutene(940 M.W.)thiophosphonate was charged at a 1 liter, 3-neck flask equipped with a stirrer, thermometer and reflux condenser. To the thiophosphonate reactant there was added 2.8 grams (0.02 mole) boron trifluoride etherate $$(BF_3 \cdot C_2H_5OC_2H_5)$$

The reaction mixture was heated to 93° C. with stirring and 28 grams (0.22 mole) of 2,3-epoxypropyl 2-propenoate was added to the flask and the stirred reaction mixture was maintained at 93° C. for a 2 hour period. At the end of the reaction period, the mixture was stripped utilizing a nitrogen flush at 93° C. under a pressure of 1–2 mm. Hg. The residual product in oil was identified as 6-polybutene(940 M.W.)thiophosphonoxy-2-hydroxy-4-oxahexyl 2-propenoate of the formula:

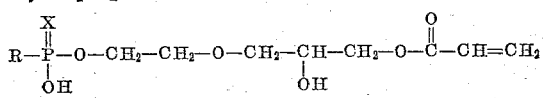

where R is a polybutene radical of an average molecular weight of 940 and X is a mixture of sulfur and oxygen. The product analyzed as follows:

| Description | Calculated | Found |
|---|---|---|
| Phosphorus, wt. percent | 1.09 | 0.81 |
| Hydroxyl No | 19.7 | 18 |
| Neut. No | 0.0 | 2.90 |
| Mole ratio oxide/thiophosphonate reactants in product | 1 | 1 |

We claim:

1. A thiophosphonoxy alkenoate of the formula:

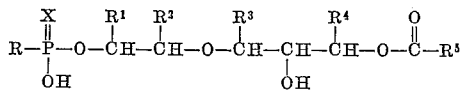

where R is a monovalent hydrocarbon derived from an aliphatic polyolefin having an average molecular weight between 250 and 50,000, $R^1$, $R^2$, $R^3$, and $R^4$ are members selected from the group consisting of hydrogen and alkyl from 1 to 6 carbons, $R^5$ is alkenyl from 2 to 20 carbons and X is a chalcogen selected from the group consisting of sulfur and a mixture consisting of a major portion of sulfur and a minor portion of oxygen.

2. An alkenoate in accordance with claim 1 wherein R is a polybutene of an average molecular weight of 940, $R^1$, $R^2$, $R^3$, and $R^4$ are hydrogen, $R^5$ is vinyl and X is a mixture consisting of a major portion of sulfur and a minor portion of oxygen.

3. A method of preparing a thiophosphonoxy alkenoate of the formula:

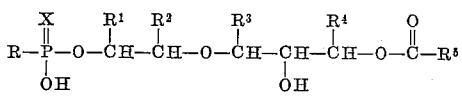

where R is monovalent hydrocarbon derived from an aliphatic polyolefin having a molecular weight between 250 and 50,000, $R^1$, $R^2$, $R^3$ and $R^4$ are members selected from the group consisting of hydrogen and alkyl from 1 to 6 carbons, $R^5$ is an alkenyl of from 2 to 20 carbons, X is a chalcogen selected from the group consisting of sulfur and a mixture consisting of a major portion of sulfur and a minor portion of oxygen comprising contacting a hydroxalkyl hydrocarbonthiophosphonate of the formula:

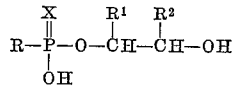

with an epoxyalkyl alkenoate of the formula:

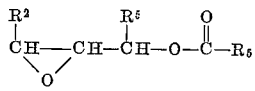

where R, $R^1$, $R^2$, $R^3$, $R^4$, $R^5$ and X are as heretofore defined at a temperature between about 50 and 150° C., in a mole ratio of epoxyalkyl alkenoate to thiophosphonate reactant of between about 0.5:1 and 2:1.

4. A method in accordance with claim 3 wherein said method is conducted in the presence of a catalyst selected from the group consisting of $BF_3 \cdot C_2H_5OC_2H_5$, $BF_3$, HF, $AlCl_3$, $SnCl_4$, $TiCl_4$, $ZnCl_4$, $H_2SO_4$, $H_3PO_4$ $CCl_3CO_2H$, $CF_3CO_2H$, Na, K, and $CH_3ONa$ in a mole ratio of epoxyalkyl alkenoate to thiophosphonate reactant to catalyst between about 0.5:1:0.01 and 2:1:0.1.

5. A method in accordance with claim 4 wherein X is a mixture consisting of a major portion of sulfur and a minor portion of oxygen and $R^1$, $R^2$, $R^3$ and $R^4$ are hydrogen.

6. A method in accordance with claim 4 wherein R is a polybutene having an average molecular weight of about 940, $R^1$, $R^2$, $R^3$ and $R^4$ are hydrogen, X is a mixture consisting of a major portion of sulfur and a minor portion of oxygen, $R^5$ is vinyl and said catalyst is boron trifluoride etherate.

No references cited.

UNITED STATES PATENT OFFICE
CERTIFICATE OF CORRECTION

Patent No. 3,158,641                                November 24, 1964

David D. Reed et al.

It is hereby certified that error appears in the above numbered patent requiring correction and that the said Letters Patent should read as corrected below.

Column 6, lines 8 to 12, the formula should appear as shown below instead of as in the patent:

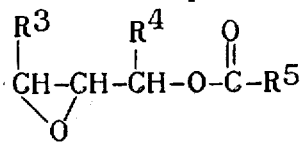

Signed and sealed this 20th day of April 1965.

(SEAL)
Attest:

ERNEST W. SWIDER                                EDWARD J. BRENNER
Attesting Officer                                     Commissioner of Patents